J. J. FIFIELD.
LOCK NUT.
APPLICATION FILED OCT. 24, 1908.
928,436.
Patented July 20, 1909.
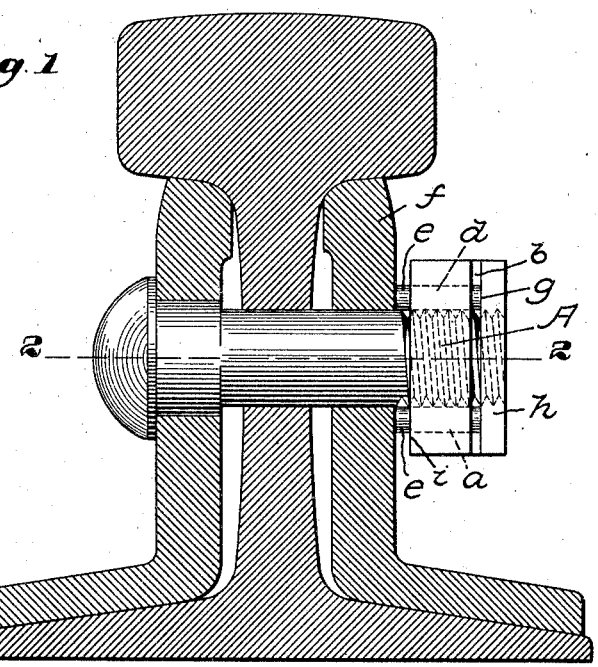
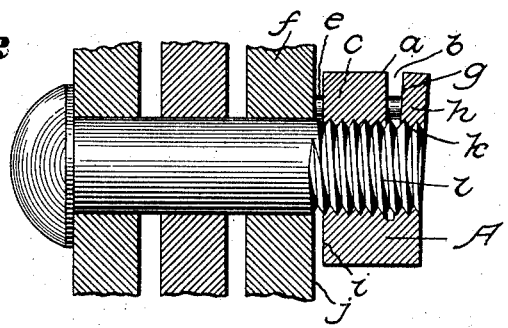
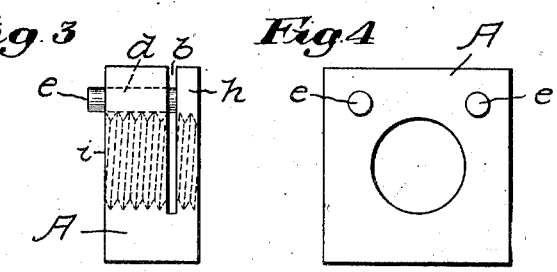
Witnesses:
Horace H. Crossman
Robert H. Kammler
Inventor:
James J. Fifield
by Emery & Booth
Attys

UNITED STATES PATENT OFFICE.

JAMES J. FIFIELD, OF MEDFORD, MASSACHUSETTS, ASSIGNOR OF ONE-HALF TO LOUIS F. BUFF, OF BOSTON, MASSACHUSETTS.

LOCK-NUT.

No. 928,436.  Specification of Letters Patent.  Patented July 20, 1909.

Application filed October 24, 1908. Serial No. 459,299.

*To all whom it may concern:*

Be it known that I, JAMES J. FIFIELD, a citizen of the United States, a resident of Medford, in the county of Middlesex and State of Massachusetts, have invented an Improvement in Lock-Nuts, of which the following description, in connection with the accompanying drawings, is a specification, like letters on the drawings representing like parts.

My invention comprises a new and improved form of lock nut.

In the drawings showing a preferred form of nut embodying my invention, selected for illustration, Figure 1 is a side elevation of the lock nut in unlocked position upon a railroad rail, as applied by hand; Fig. 2 is a vertical section, showing the nut in locked position, screwed up by a wrench, the nut being turned one quarter around; Fig. 3, an elevation of the nut as shown in Fig. 1; and Fig. 4, a view of the under side of the nut.

Referring to Figs. 1 and 2, the nut A of otherwise usual form, has one side $a$ slotted at $b$, preferably to a point beyond the bore of the nut. The base portion $c$ of the nut is drilled at one or more points, herein at two points $d, d$ to receive the pins $e, e,$ fitting snugly but also movable in the holes referred to, and preferably of harder metal than the usual surface, for example, the fish plate $f$, Figs. 1 and 2, with which their ends come into contact. The pins $e\ e$ are headless and are of substantially uniform diameter throughout, so that they may readily be removed in the event of undue wear at either end. The inner ends of the pins $e, e$ are normally in contact with the under side $g$ of the outer member $h$ of the nut, and the outer ends of said pins protrude somewhat beyond the inner face $i$, of the nut.

When the nut is applied, it may be readily turned up with the fingers until the pins $e, e$ contact with the surface or plate $f$. Further turning up of the nut forces the pins $e, e$ outward against the inner face $g$ of the outer member $h$ to flex or bend the latter slightly outward and cramp a portion, at least, of the thread $k$ thereof tightly against the coöperating thread of the bolt $l$, Fig. 2. The cramping of the threads, as described, causes the nut to be securely locked against rotation upon the bolt. The pins $e, e$ being of hard metal the outer ends thereof do not readily wear, consequently they may be used indefinitely. Furthermore, turning of the nut may cause the pins $e, e,$ owing to their hardness, to cut slightly into and become, so to speak, anchored in the surface $j$ of the plate $f$, and tend to prevent retrograde movement of the nut to loosen the same.

When the nut is unscrewed the member $h$ readily springs back into its normal position unless the nut has been turned up unusually tight. In that case a slight blow with a hammer or wrench upon the outer surface of the nut will return the member $h$ to its normal position.

If the nut should be turned up so tightly as to break off the member $h$ the remaining member $c$, constituting the main portion of the nut still furnishes a holding means and as effective as the ordinary nut. Since the slot $b$ is extended beyond the bore into the thick portion of the nut, there is little danger of the member $h$ breaking off.

My improved lock-nut is certain in its operation and readily applied, requiring no special tool for locking it; yet its use does not destroy nor even mutilate the thread either of the bolt or nut. There are no separate or nicely adjusted parts or members to become detached and possibly lost, and the nut may be manufactured at small cost.

Claim.

The combination with a transversely slotted nut, one member of which is provided with a longitudinal auxiliary passage, of a normally withdrawable headless clamp-actuating pin of substantially uniform diameter throughout and arranged in said auxiliary passage and in contact with the other nut member, thereby to cause thread clamping flexure of the latter upon screwing up of the nut.

In testimony whereof, I have signed my name to this specification, in the presence of two subscribing witnesses.

JAMES J. FIFIELD.

Witnesses:
EVERETT S. EMERY,
ROBERT H. KAMMLER.